United States Patent [19]

Lumsden

[11] 4,128,480

[45] Dec. 5, 1978

[54] FILTRATION OF LIQUORS

[75] Inventor: John R. Lumsden, Roxboro, Canada

[73] Assignee: Alcan Research and Development Limited, Montreal, Canada

[21] Appl. No.: 821,947

[22] Filed: Aug. 4, 1977

Related U.S. Application Data

[63] Continuation of Ser. No. 602,190, Aug. 6, 1975, abandoned.

[30] Foreign Application Priority Data

Aug. 23, 1974 [GB] United Kingdom ............... 37285/74

[51] Int. Cl.² ............................................. B01D 35/16
[52] U.S. Cl. .................................. 210/332; 210/409; 210/415
[58] Field of Search .................. 55/242; 210/486, 332, 210/333, 159, 333.1, 346, 409, 413, 415, 107, 108

[56] References Cited

U.S. PATENT DOCUMENTS

| 1,096,133 | 5/1914 | Shepherd | 210/409 |
| 2,426,618 | 9/1947 | Klein | 210/346 |
| 2,540,362 | 2/1951 | Winslow et al. | 210/486 |
| 2,854,142 | 9/1958 | Baker | 210/332 |

Primary Examiner—Frank Sever
Attorney, Agent, or Firm—Cooper, Dunham, Clark, Griffin & Moran

[57] ABSTRACT

In a large scale filtration apparatus filtration is performed in a vertical cylindrical vessel, in which a number of spaced filter leaves are suspended. The liquor to be filtered is introduced into the shell and the filtrate is led out from the interior of the individual leaves. The filter residues are removed from the leaves at intervals by means of a spray device located in the top of the shell above the leaves. A spray bar, having a downwardly facing elongated slit orifice and rotating slowly about the axis of the shell, is preferably employed for this purpose.

5 Claims, 3 Drawing Figures

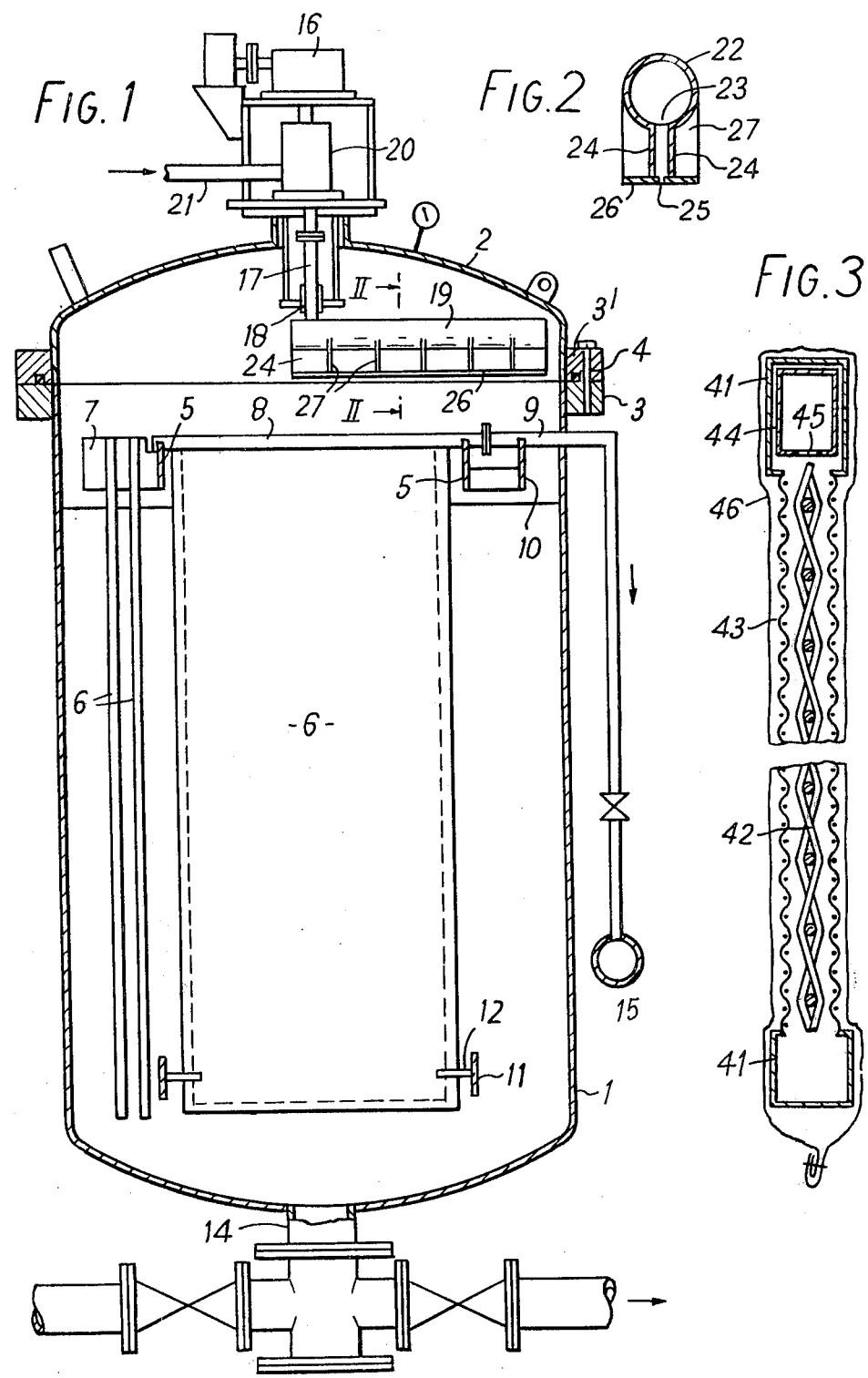

FILTRATION OF LIQUORS

This is a continuation, of application Ser. No. 602,190 filed Aug. 6, 1975, now abandoned.

The present invention relates to filtration apparatus and in particular to filtration apparatus in which the liquor to be filtered is passed through a filter medium under substantial pressure.

In many large volume industrial processes, of which the Bayer process for the production of alumina from bauxite may be considered an example, residue builds up in the filter medium relatively quickly. In order to maintain a reasonable filtration rate this residue must be removed after it becomes more than about 25 mm thick. This removal will be necessary at periods depending on filtration rate, solids content of liquor, etc., but normally at periods between 2 and 7 hours. Both to avoid the excessively rapid formation of a thick filter cake and to achieve a large throughput with an apparatus of a given volume, the filter medium commonly takes the form of a filter leaf, which comprises a flat framework, supporting a pair of spaced screen members. The screen members act as a backing for filter material, such as a woven fabric, the liquor to be filtered passing inwardly through the filter material into the space within the flat framework, from whence the filtered liquor is led away through an outlet pipe. The solid matter removed from the liquor is thus deposited on the outer surface of the filter material, backed by the screen and forms a filter cake which is removed therefrom periodically by washing. The filter leaves are therefore arranged in a substantially vertical position to assist in the removal of the solids from the filter material by washing sprays.

In certain filtration operations, such as the filtration of Bayer process liquor, the filter cake becomes somewhat hard as the result of the deposition of scale. In consequence the cleaning of the filter elements presents particular problems and it is necessary to apply high energy sprays to the face of the filter material, which is normally a woven fabric, in order to achieve satisfactory removal of the filter cake.

As is well recognized, pressure vessels are generally of circular cross-section and the shell of a pressure filtration apparatus of the type under discussion is commonly of generally cylindrical profile. In order to make best use of the space within the shell the individual leaves are arranged side by side in close spacing within the shell and may be circular, at right angles to the cylinder axis, or rectangular, parallel to the axis. The cylindrical shell is conventionally arranged with its axis horizontal, so that the leaves are arranged vertical for cleaning purposes. The cylindrical shell may be split into two semi-cylindrical halves, which are hinged to each other to permit the apparatus to be opened for access or one end of the vessel may be removable, allowing the leaves to be exposed. The individual filter leaves are then washed down with hoses to break up the filter cake and to remove the filtered out solids as an aqueous slurry. In such arrangement the filter leaves are stationary and may be any convenient constructional shape, such as square or rectangular. The apparatus suffers from the inconvenience that the filter leaves are cleaned by hand-held hoses and the cost of the leaf-exposing mechanism is relatively high.

In other arrangements the use of automatically washed filter leaves has been proposed. In this case the filter leaves are mounted for rotation about the axis of the pressure vessel, such rotation carrying them past stationary spray nozzles arranged at the periphery of the apparatus and positioned to direct spray jets radially between adjacent pair of leaves. In such case, not only is there the added complication and expense of mounting the filter leaves for rotation, but there is also the difficulty of ensuring that all the spray nozzles remain effective and do not become blocked by scale-like deposits during the filtration cycle, when the jets are not in operation.

In another form of apparatus the cylindrical filter casing is arranged with its axis vertical, the filter leaves being horizontal. The cleaning of the filter leaves is arranged by spray bars which rotate about the axis, a spray bar being arranged between each pair of filter leaves. Here again the apparatus is complicated and the washing of the filter leaves is less effective than when they are mounted vertically.

The object of the present invention is to produce a simple design of self-cleaning leaf-type filter apparatus.

In yet other apparatus proposed by Russian workers the cylindrical shell is mounted with its axis in a vertical position with the leaves arranged substantially parallel to the axis of the shell. The apparatus of the present invention follows that proposal but is provided with a greatly simplfied means for washing down the filter residue from the outer faces of the leaves. For this purpose, in accordance with the invention, a spray head is arranged at the top end of the cylindrical shell above the leaves to direct water jets downwardly between the leaves. The spray head preferably takes the form of a spray bar arranged to rotate about the vertical axis of the cylindrical casing. The spray bar preferably has a single aperture in the form of an extended slit to avoid the possibility of obstruction by scale deposited from the liquor.

In the apparatus of the present invention the filter leaves are preferably constructed on a rectangular frame, formed of hollow section material, which provides an exit channel for the filtered liquor. The width of the frames is preferably a little in excess of half the diameter of the casing. The top horizontal member of each leaf frame preferably projects outwardly from the vertical members and these projections serve to support the leaves by resting on horizontal rails, which are provided in the upper part of the cylindrical shell. The filter leaves may be arranged to extend in two sets, arranged in planes substantially perpendicular to each other, so as to make fuller use of the space available within the cylindrical casing, or a number of different screen widths may be used.

The top end of the cylindrical casing with the spray head and associated drive is preferably constructed as a removable unit, which can be lifted clear of the cylindrical body by any convenient form of overhead hoist to provide access to the filter leaves for periodic removal to permit replacement of the filter fabric.

Referring now to the accompanying drawing:

FIG. 1 is a vertical section through a filter made in accordance with the invention, FIG. 2 is a section of the spray bar, and FIG. 3 is a section of a suitable filter leaf.

The shell of the filter press comprises a cylindrical body 1 and an upper end cap 2. The parts 1 and 2 are provided with flanges 3, 3' which are connected to each other by bolts 4.

In the upper region of the body 1 a pair of transverse support rails 5 are provided to support filter leaf elements 6. Supplementary support rails 7 are provided to support an extra pair of filter leaf elements 6, arranged to lie in a plane perpendicular to the elements supported by rails 5. The tubular top members 8 of the elements 6 are disconnectably connected with spigot pipes 9. These spigot pipes 9 extend through the wall of the body 1 and are supported by a transverse member 10.

In the lower region of body 1 there are a pair of transverse members 11 with lateral projections 12, which serve to locate the leaves 6 and hold them at correct spacing in relation to each other.

Liquor to be filtered is introduced into the shell through an axial inlet 14, which also acts as an outlet for the wash liquor. The liquor, led out through the spigot pipes 9, is introduced into a manifold 15.

The upper end cap 2 of the shell supports a drive motor 16, which drives a hollow drive shaft through a reduction gear. The shaft 17 extends downward through a bearing 18 and carries a spray bar 19 at its lower end. Wash water is supplied to the spray bar 19 through a rotary union 20 via an inlet pipe 21.

The construction of the spray bar is shown in FIG. 2. It comprises a tube 22, having a longitudinal slot 23 extending along its full length. A pair of parallel plates 24 form a channel through which wash water is conveyed to a narrower slit 25 in a bottom plate 26. The spray bar is reinforced by strengtheners 27, which may also be continued between the plates 24 to form baffles, to provide a substantially uniform vertical down-spray jet.

When it is desired to wash the filter cake from the surfaces of the leaves 6, the remaining liquor is drained out of the shell. The motor 16 is then started up to drive the spray bar very slowly, for example 5-20 revolutions per hour. The washing may conveniently begin as the liquor drains, saving time, and letting lumps be carried away with the liquor.

The width of the slit 25 may conveniently be about ⅛ to 3/16 inch (about 3 mm to 5 mm). With a filter having a shell of about 8 ft. diameter (about 250 cms), a supply of wash water of about 50 c.f.m. (about 1400 liters/min.) at 60 p.s.i.g. is found satisfactory for washing down the filter cake. The resulting slurry may then be led out through the inlet 14.

A suitable filter leaf for the filter apparatus is illustrated in FIG. 3. This comprises a hollow rectangular frame 41, which supports an open weave core mesh 42, formed of coarse wire, and a fine weave outer mesh 43, closely woven from fine wire. A collector tube 44, suitably apertured at 45 to permit entry of filtrate, is housed within the frame 41. The ends of the tube 44 extend through the frame 41, one end of the tube 44 being closed off and the other end being adapted for connection to a spigot pipe 9.

The filter leaf is enclosed within a filter bag 46 of tightly woven canvas, which has sock ends, which surround and are tightly bound to the ends of tube 44. The woven canvas filter bag 46 is pressed against the layers of the outer mesh 43 by the pressure of the liquid supplied for filtration.

The described apparatus is capable of modification in a number of respects. Thus additional filter leaves may be suspended beneath the spigot pipes 9. In other modified constructions concentric circular filter leaves may be employed in place of the flat leaves 6 in the illustrated construction. In yet other modifications the filtrate may be withdrawn through outlet pipes arranged at or near the lower end of the individual filter elements, whilst in other instances the individual filter elements may supply filtrate to a manifold located within the body shell.

In other modifications the rotating spray head may be replaced by an array of stationary spray bars, positioned to direct water jets into the spaces between adjacent leaves. The described rotating spray bar is greatly preferred however because of its overall coverage of the surfaces of the filter bags 46 and because its employment of a single elongated slit reduces the risk of blockage by deposition of scale during the normal operation of the filter when the spray bar is inoperative, and because the rotating spray bar permits effective washing with a minimum of wash water.

I claim:

1. Filtration apparatus comprising a vertically arranged cylindrical body shell for receiving a supply of liquid under pressure, a liquid inlet in said shell, an array of generally rectangular, stationary planar filter elements, each including two spaced layers of filter material and means for leading off filtrate from an enclosed space defined between said layers, said filter elements being arranged upright and substantially parallel to the axis of the body shell, a spray bar arranged above the array of filter elements and mounted for rotation about the axis of the body shell, said spray bar having a continuous, longitudinally extending, downwardly facing, outlet slit dimensioned to pass over the entire array of filter elements during each complete rotation of the spray bar, means for rotating said spray bar about said axis and means for supplying wash liquor under pressure to said spray bar such as to generate a downward curtain of wash liquor descending from said slit substantially radially of said shell in a direction substantially parallel to the axis of the body shell and moving around said array so as to establish downward streams of wash liquor between said filter elements, such that substantially all portions of the surfaces of said filter elements are sprayed by the rotating slit notwithstanding localized clogging of portions of said slit, said filter elements and said spray bar being mutually disposed for intersection of the curtain of wash liquor with the planes of the surfaces of said filter elements with progressive change in location and angle of intersection as the spray bar rotates such that said streams move progressively along said filter elements, said body shell being provided with means for removing wash liquor from the lower end thereof.

2. Filtration apparatus according to claim 1, in which each of the individual filter elements is provided with a horizontal frame member at the top end thereof and extending beyond the lateral edges of said elements, said frame member constituting a filtrate outlet at one end, said body shell including a pair of spaced support members for supporting a plurality of said elements arranged substantially parallel to each other, and a plurality of spigot pipes extending through the wall thereof, said spigot pipes each being connected to the outlet ends of the horizontal member of a filter element.

3. Filtration apparatus according to claim 1, further including a pair of horizontal filter element support members in the upper part of said body shell, each of said filter elements being provided with laterally extending projections at the top end thereof arranged to rest on said support members and a pair of filter element separating members arranged in the lower part of said shell parallel with said support members, said separating members carrying projections at spaced intervals for projecting between and separating the lower ends of adjacent filter elements.

4. Filtration apparatus according to claim 1, in which said spray bar and the associated means for rotating the spray bar are supported by a removable top end closure of said body shell whereby to provide access to said filter elements.

5. Filtration apparatus according to claim 1, in which more than half of the elements of said array are arranged parallel to each other and the remainder of the elements of said array are arranged to lie in a direction perpendicular to the planes of the first-mentioned elements.

* * * * *